United States Patent Office 3,456,476
Patented July 22, 1969

3,456,476
ROLL HOUSING FOR A METAL
WORKING MACHINE
Alec John Jones, Wimborne Minster, Dorset, England, assignor to S.T.D. Services Limited, Edgbaston, Birmingham, England, a British company
Filed Jan. 17, 1967, Ser. No. 609,959
Int. Cl. B21b 31/00
U.S. Cl. 72—237    1 Claim

ABSTRACT OF THE DISCLOSURE

A roll housing for a metal working machine comprises a base and a removable top part. The base and the top part have interfitting lugs and the lugs on the base part slidably support hydraulically driven wedges which can be driven into openings on opposite sides of the lugs in the top part to lock the top part securely on to the base part.

---

Figure 1:
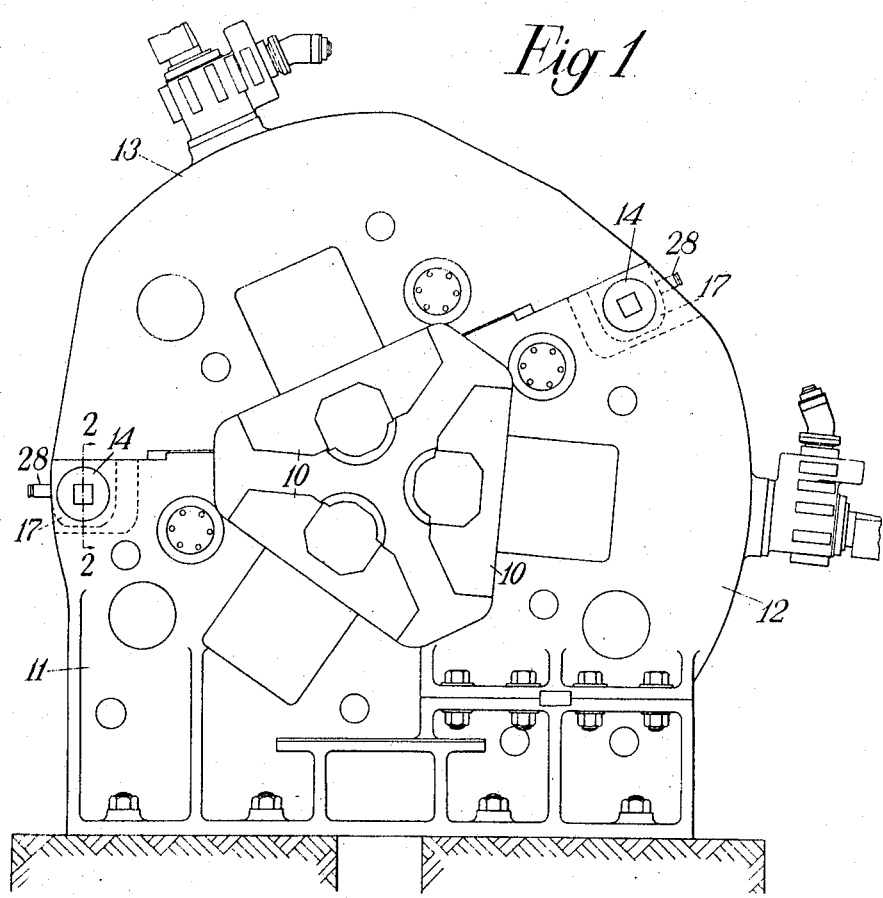

This invention relates to a roll housing for a metalworking machine of the kind including pressure-applying rolls whereby workpieces are fed and worked. It is an object of the invention to provide such a roll housing in a convenient form.

A roll housing in accordance with the invention comprises a removable top part, removal of which from the base part in use, permits removal and replacement of the rolls, and locking means whereby the top part is connected, in use, to the base part, the locking means including a plurality of wedge elements slidably mounted on one of said parts and movable into engagement with co-acting wedge surfaces by fluid operated means.

Figure 2:
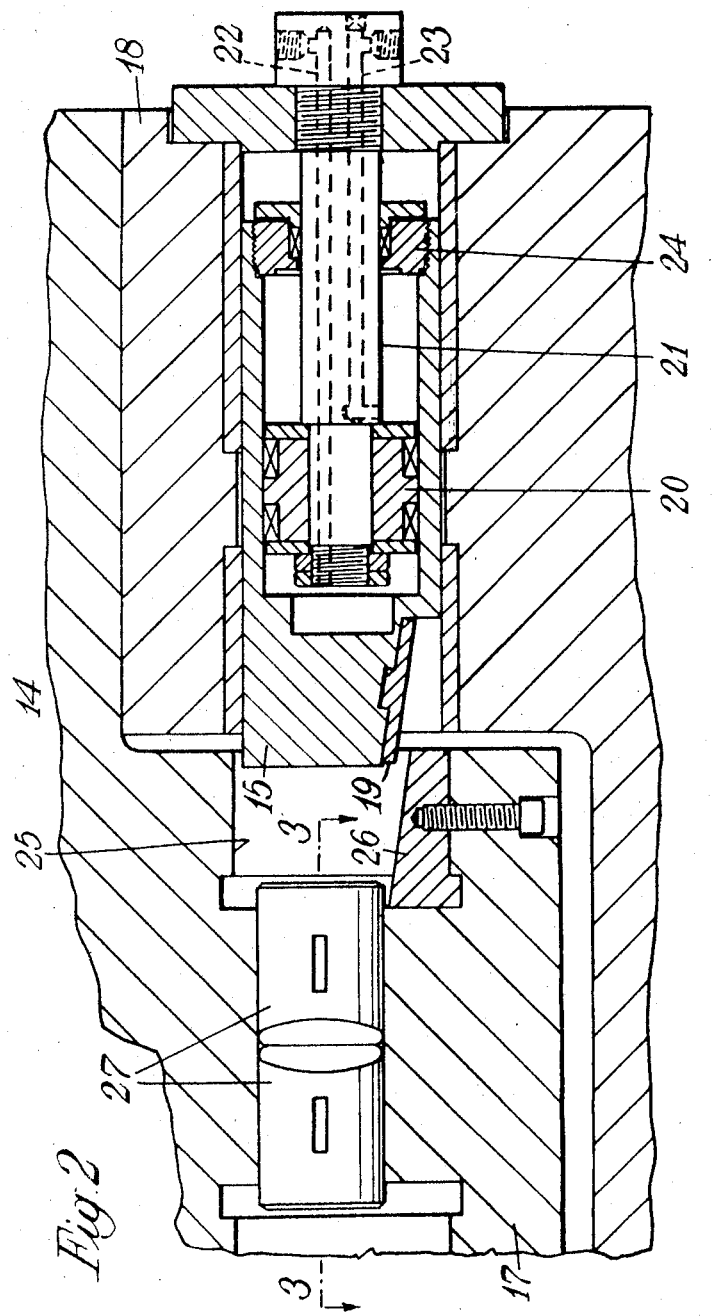
Figure 3:
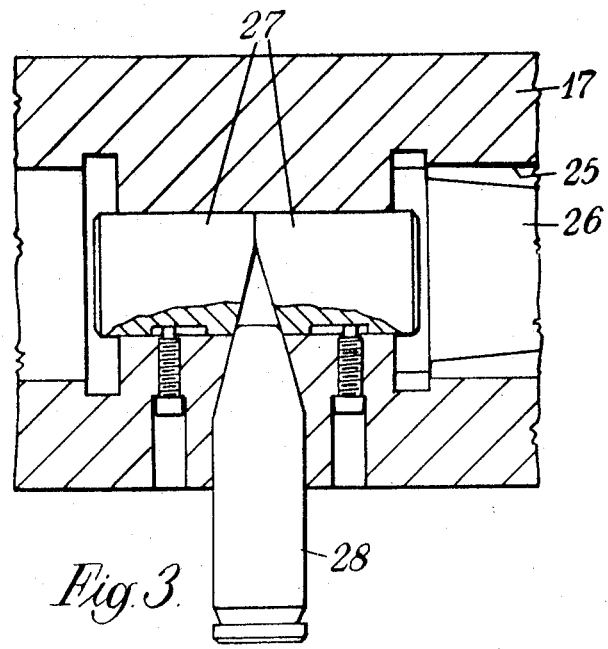

The accompanying drawings illustrate an example of a roll housing in accordance with the invention. In the drawings:

FIGURE 1 is a view in elevation of the housing,
FIGURE 2 is a view in enlarged section taken on line 2—2 in FIGURE 1, and
FIGURE 3 is a view in section taken on line 3—3 in FIGURE 2.

The roll housing shown is for a three-roll piercing machine used for manufacturing tube from metal billets. In the roll housing, supports 10 are provided for the bearings of the three rolls. The rolls are rotatable on skew axes so that rotation of the rolls will impart feeding motion to a billet engaged thereby. The billet is thus forced on to a plug (not shown) located close to the rolls, and which plug pierces the billet to form the tube.

The roll housing is made up of three castings 11, 12, 13, two (11, 12) of which are secured together to make up a base part. The other casting 13, forms a top part and is removable to permit removal of the rolls and their bearings from the bearing supports.

Locking means 14 are provided for securing the top part 13 to the base part 11, 12. The locking means includes wedge elements 15 slidably mounted in the base part. In fact, there are provided two pairs of wedge elements 15 co-acting respectively with the two ends of the top part 13. Each such end is provided with a depending lug 17 adapted to fit between a pair of lugs 18 in the associated portion of the base part. The wedge elements are slidably mounted respectively in these lugs 18 on the base part 11, 12.

Each wedge element 15 is in the form of a cup, the closed end of which is provided with a hard pad 19 at an acute angle to the axis of the cup. Each wedge element 15 has a piston 20 slidable in its interior and this piston 20 is fixed to the piston rod 21 itself secured to the base part. The piston rod 21 has a pair of longitudinal bores 22, 23 which open on opposite sides of the piston and the wedge element has an annular guide 24 secured to its open end and sliding on the piston rod. Thus introduction of pressurized fluid into the closed end of the wedge element 15 will cause the latter to be driven towards the lug 17 on the top part 13. This lug 17 has an opening 25 to receive the closed end of the wedge element 15 and has a hard wedge insert 26 engageable by the hard pad.

A passage in the lug 17 interconnects the two openings 25 therein and slidable in this passage are two plungers 27. A peg 27 having a wedge shaped end is slidable in a cross bore in the lug 17 and can be driven between the plungers 27 to drive these into the openings 25 when required.

In use, all four wedge elements 15 are driven home when it is desired to use the machine. When a change of rolls is necessary, the top part is simply removed by hydraulically withdrawing the wedge elements 15 and then lifting the top part clear utilizing a crane. Should a wedge element stick in engagement with the wedge surface, it can be freed by driving in the peg 28 to cause the associated plunger 27 to strike the stuck wedge. Alternatively freeing action can be obtained by coupling a high pressure manually operated pump to the appropriate bore in the piston rod. If this fails, the other wedge element of the pair can be removed together with the plungers 27 to allow a bar to be inserted through the connecting passage in the lug 17 on the top part 13 and additional force can thus be brought to bear on the wedge element 15.

Having thus described my invention what I claim as new and desire to secure by Letters Patent is:

1. A roll housing for a metal working machine comprising a base and a top part on the base, said base and said top part supporting metal working rolls, two pairs of lugs on the base, a pair of lugs on the top part adapted to fit respectively between the pairs of lugs on the base, each of the lugs on the top part having a pair of openings in opposite sides thereof, four hydraulically driven wedge devices slidably mounted in the lugs on the base and hydraulically drivable into wedging engagement with the openings in the lugs on the top part, a passage in each lug on the top part interconnecting the two openings therein, and release means comprising a pair of plungers slidable in the passage and a peg having a wedge shaped end slidable in a cross bore in the lug and drivable between the plungers to displace the same into the openings in the lug to engage the wedge devices for freeing the wedging action.

References Cited

UNITED STATES PATENTS

| | | | |
|---|---|---|---|
| 1,765,907 | 6/1930 | Czemba et al. | 72—246 |
| 1,771,750 | 7/1930 | Ellis | 72—244 |
| 2,550,925 | 5/1951 | Weimar | 205—5 |

CHARLES W. LANHAM, Primary Examiner
B. J. MUSTAIKIS, Assistant Examiner